United States Patent [19]

Heidel et al.

[11] Patent Number: 5,183,872
[45] Date of Patent: Feb. 2, 1993

[54] PROCESS FOR THE PEPARATION OF FINELY DIVIDED, WATER-SWELLABLE POLYSACCHARIDE GRAFT POLYMERS

[75] Inventors: Klaus Heidel; Sigrid Scholz-Weigl, both of Marl, Fed. Rep. of Germany

[73] Assignee: Starchem GmbH, Krefeld, Fed. Rep. of Germany

[21] Appl. No.: 782,805

[22] Filed: Oct. 25, 1991

[30] Foreign Application Priority Data

Nov. 2, 1990 [DE] Fed. Rep. of Germany ....... 4034882

[51] Int. Cl.⁵ ...................... C08F 251/00; C08F 2/18; A61F 13/15; A61L 15/22
[52] U.S. Cl. .................................. 527/300; 527/312; 527/313; 527/314; 527/315
[58] Field of Search ............... 527/300, 312, 313, 314, 527/315

[56] References Cited

U.S. PATENT DOCUMENTS 4,131,576 12/1978 Iovine et al. ..................... 527/312
4,464,523 8/1984 Neigel et al. ..................... 527/313
4,777,232 10/1988 Heidel ................. 527/300
5,032,659 7/1991 Heidel ................. 527/313

OTHER PUBLICATIONS

Billmeyer, Jr. "Textbook of Polymer Science" Third Edition, Wiley & Sons, New York 1984, pp. 126–127.

Primary Examiner—Nathan M. Nutter
Attorney, Agent, or Firm—Oblon, Spivak, McClelland, Maier & Neustadt

[57] ABSTRACT

Polysaccharide graft polymers are prepared by semi-continuous reverse-phase suspension polymerization, partial dewatering and crosslinking, wherein during and after the suspension polymerization, in which an aqueous solution of an at least partially neutralized, olefinically unsaturated carboxylic acid is added to a suspension of a polysaccharide in a nonpolar organic solvent, the viscosity is reduced by adding amphoteric ammonium compounds or quaternary imidazolinium salts to the reaction medium.

11 Claims, No Drawings

PROCESS FOR THE PEPARATION OF FINELY DIVIDED, WATER-SWELLABLE POLYSACCHARIDE GRAFT POLYMERS

BACKGROUND OF THE INVENTION

1. Field of the Invention

The present invention relates to a process for the preparation of finely divided, porous and rapidly water-swellable polysaccharide graft polymers. These polymers are prepared by semicontinuous reverse-phase suspension polymerization, partial dewatering and subsequent cross-linking.

2. Description of the Background

Water-absorbent polymers are widely used in the sanitary and hygiene sectors as water absorbents in paper napkins and cloths, as tampons, patient undersheets, electrolyte thickeners in dry batteries, as humectants and water-storage agents in agriculture and as desiccants. Suitable polymers include polysaccharides, usually grafted with water-soluble vinyl monomers, such as carboxymethylcellulose, hydrolysed starch-acrylonitrile graft polymers, acrylic acid-starch graft polymers, and fully synthetic, weakly crosslinked polymers, such as partially crosslinked polyacrylic acid salts and partially crosslinked polymaleic acid derivatives.

The incorporation of starch into water-swellable graft polymers allows particular product properties to be produced, compared with fully synthetic polymers. Thus, the porosity of the polymer particles is increased, the absorption rate is increased and the biodegradability is improved.

The preparation of the graft polymers by direct grafting of starch with acrylate in aqueous solution is not technically simple. In order to achieve the most homogeneous distribution possible, which is necessary for the grafting, of starch in the aqueous monomer solution, prior swelling of the starch is necessary. This considerably increases the viscosity of the monomer solution, a paste-like consistency being obtained if more than about 10% of starch is used.

DE-C 26 12 846 discloses the preparation of water-absorbent graft polymers by grafting water-soluble monomers, such as acrylic acid, onto starch in the presence of a crosslinking agent. The grafting reaction is carried out in aqueous solution or in an aqueous-alcoholic medium as a precipitation polymerization. The grafting in aqueous solution in this process gives rubber-like, non-stirrable gels from which pulverulent end products can only be obtained after drying and grinding. By contrast, if the grafting is carried out as a precipitation polymerization in the presence of an approximately 20-fold excess of alcohol as precipitant, finely divided products having an only moderate liquid-absorption capacity are produced.

According to Japanese Patent 80/139,408, polymerization of acrylonitrile in aqueous medium in the presence of starch results in the preparation of a graft polymer, which can subsequently be hydrolysed and crosslinked. A powder having a water-absorption capacity of from 150 to 180 ml/g is obtained.

Finely divided water-absorbent polymers can be prepared by polymerization of partially neutralized acrylic acid in inverse suspension, also known as reverse-phase suspension. In this process, a water-soluble monomer in the form of an aqueous solution is emulsified in a hydrophobic medium in the presence of a dispersant and polymerized to give a finely divided end product. In the presence of a polysaccharide, such as starch, water-soluble or water-insoluble, swellable graft polymers can be obtained.

A graft polymerization in inverse suspension is described in Japanese Patent 80/161,813. In this process, a mixture of n-hexane and sorbitan monostearate, starch, water, acrylic acid, sodium hydroxide solution and water-soluble initiator is first prepared before the polymerization is initiated by warming. However, the reaction product tends to form lumps during the polymerization and is not produced in finely divided form.

DE-C-28 40 010 discloses the preparation of water-swellable polysaccharide graft polymers by inverse suspension polymerization, a batch process being preferred. In this process, a polysaccharide is first suspended in a water-immiscible solvent in the presence of a surface-active agent. An aqueous monomer solution, predominantly containing acrylamide or a cationic monomer and possibly also small amounts of acrylic acid, is subsequently added at room temperature. After addition of an initiator, the mixture is warmed and polymerized. The solid contents, based on the aqueous polymerization mixture, are above 50%. This process does not use any crosslinking agents and does not produce any water-swellable, gel-like polymers. The batchwise preparation process results in temperature peaks at the beginning of the polymerization which are difficult to control in large batches.

In EP-B-0 083 022, acrylic acid is polymerized in the presence of starch in aqueous solution. The products can then be crosslinked in an inert solvent in the presence of from 0.01 to 1.3 parts of water per part of resin. The preparation of the starch graft polymers is carried out at a solids content of only 20%. In addition, these starch graft polymers have only a low water-absorption capacity, whether crosslinked or uncrosslinked.

According to DE-A-38 01 633, polysaccharide graft polymers are prepared by inverse suspension polymerization, partial dewatering and crosslinking. However, the inverse suspension polymerization is carried out in one step and batchwise by first combining all the reaction components and then initiating the polymerization by heating in the presence of an initiator. The beginning of the polymerization is accompanied by the sudden liberation of heat. In industrial production reactors, sufficiently rapid dissipation of the heat of polymerization can frequently only be ensured with difficulty.

In German Patent Application P 40 14 628.6, the preparation of polysaccharide graft polymers is further improved. Here, a semicontinuous reverse-phase suspension polymerization is carried out in which an aqueous solution of an unsaturated carboxylic acid and an initiator is added continuously to a suspension of a polysaccharide in an organic solvent containing a dispersant combination. This process allows reliable dissipation of the heat of polymerization. However, an increase in viscosity, which is associated with increased energy consumption by the stirrer, follows the completion of the feed of the aqueous solution and accompanies the beginning of the subsequent azeotropic partial dewatering. The high viscosity increases the tendency of the swollen polymer particles to agglomerate. A need therefore continues to exist for an improved procedure for the preparation of polysaccharide graft polymers by reverse phase suspension polymerizatin which prevents viscosity increases of the polymerization medium.

SUMMARY OF THE INVENTION

Accordingly, one object of the present invention is to limit or completely prevent the increase in viscosity in the preparation of polysaccharide graft polymers by semicontinuous reverse-phase suspension polymerization.

Briefly, this object and other objects of the present invention as hereinafter will become more readily apparent can be attained in a process for the preparation of finely divided, porous and rapidly water-swellable polysaccharide graft polymers by the steps of semicontinuous reverse phase suspension polymerization, partial dewatering and crosslinking, wherein, during the suspension polymerization step an aqueous solution containing from 60 to 95 parts of an olefinically unsaturated carboxylic acid which has been neutralized to the extent of from 50 to 100%, from 0 to 50 parts of further, olefinically unsaturated monomers, from 0 to 2 parts of crosslinking agent and from 0.005 to 5 parts of polymerization initiator, is added continuously at from 40° to 100° C. over the course of from 0.5 to 5 hours to a suspension of from 5 to 40 parts of polysaccharide and from 0 to 2 parts of polymerization initiator in a nonpolar organic solvent which contains a dispersant mixture of (a) from 50 to 100 percent by weight of nonionic surfactant having a hydrophilic-lipophilic balance of 0.5 to 10, and (b) from 0 to 50 percent by weight of nonionic surfactant having a hydrophilic-lipophilic balance of from 10.5 to 20, and wherein, after from 75 to 100% of the aqueous monomer containing solution has been added, an amphoteric ammonium compound containing an alkyl radical having 6 to 20 carbon atoms, a quaternary imidazolinium salt containing an alkyl radical having 6 to 20 carbon atoms, or a mixture thereof, is added as an additional dispersant.

DETAILED DESCRIPTION OF THE PREFERRED EMBODIMENTS

The discovery of the present invention is surprising, since subsequent addition of nonionic dispersants, as carried out in DE-A-38 23 729 in the reverse-phase suspension polymerization of polyacrylates, where it results in an improved particle size distribution, causes neither a better particle size distribution nor a reduction in viscosity in the reverse-phase suspension polymerization of polysaccharide graft polymers.

Since the polysaccharide graft polymers prepared by means of the present process are regarded as polyanions with a negative electrical charge, it is furthermore surprising that their very additional dispersants according to the invention are effective. No effect is expected from the addition of amphoteric ammonium compounds having a positive and negative charge, and even the opposite effect, i.e. agglomeration and increased viscosity, is normally expected from the addition of quaternary imidazolinium salts having a positive charge. The amphoteric ammonium compounds which are suitable as the additional dispersants have electropositive and electronegative groups in the same molecule. They are thus betaines. Preference is given to alkylbetaines of structure I:

and alkylsulfobetaines of the structure II:

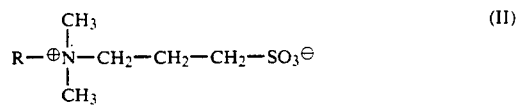

wherein R is in each case an alkyl radical having 6 to 20 carbon atoms. Examples of compounds of this type are lauryldimethylammonium propylbetaine, palmityldimethylammonium propylbetaine, lauryldimethylammonium propylsulfobetaine and coconut fat dimethylammonium propylsulfobetaine. Also suitable are distearylmethylammonium propylsulfobetaine, N-alkylaminopropylaminoacetic acids having a betaine structure

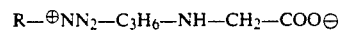

and N-alkylamidopropylbetaines of the structure

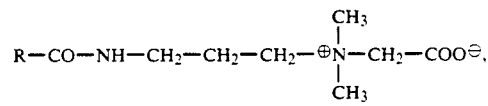

where R may be, for example, the alkyl radical of coconut fatty acid. According to Fieser and Fieser, Organic Chemistry, 1965, 1208, coconut fatty acid is a mixture of carboxylic acids having 8 to 18 carbon atoms, ⅔ of which comprises lauric acid and myristic acid.

A further group of preferred additional dispersants is quaternary imidazolinium salts having the betaine structure III:

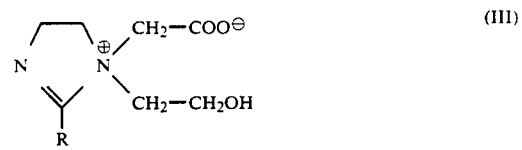

where R is an alkyl radical having 6 to 20 carbon atoms.

An example of a compound of this type is coconut imidazoline, prepared using coconut fatty acid, containing the principal constituent:

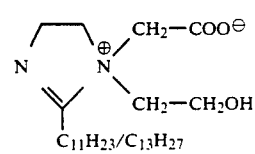

Also preferred are quaternary imidazolinium salts of the structure IV:

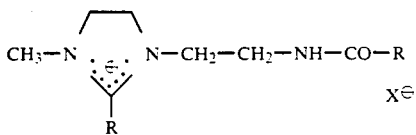

in which R is alkyl having 6 to 20 carbon atoms, and $X^\ominus$ is preferably the methylsulfate anion. An example of a salt of this type is 1-methyl-2-undecyl-3-undecylamidoethylimidazolinium methylsulfate of the following structure:

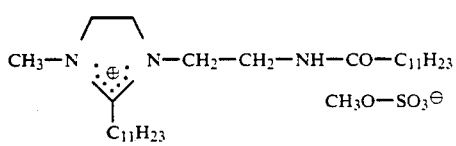

It is produced as the principal product when dietnyylene triamine coconut fatty acid and methyl sulfate are reacted.

The additional dispersant is normally employed in an amount of from 0.2 to 4 per cent by weight, based on the olefinically unsaturated carboxylic acid. Amounts of from 0.4 to 2 per cent by weight are preferred.

The total amount of additional dispersant can be added as soon as 75% of the olefinically unsaturated carboxylic acid has been metered in. It is also possible to add several part amounts of the additional dispersant before the addition of carboxylic acid. However, the additional dispersant is preferably added after the addition of the olefinically unsaturated carboxylic acid or after polymerization.

Polysaccharides which are suitable for the process according to the invention include starches, starch derivatives and cellulose derivatives. Starches are preferred. Native starches made from potatoes, maize, wheat, rice or tapioca roots, furthermore wax maize or high-amylose starch and derivatives thereof, such as, for example, starch ethers and starch esters, can be employed. Particularly suitable are soluble starches, which usually comprise slightly hydrolytically or oxidatively degraded starches. Preference is given to starches having a viscosity of from 20 to 25,000 mPa s, measured on a 10% strength paste at 20° C., viscosities of from 40 to 500 mPa s being particularly preferred. From 10 to 25 parts of starch are particularly preferably dissolved in the organic solvent.

The solvents employed for the organic phase are hydrocarbons having 6 to 12 carbon atoms. Aliphatic or alicyclic hydrocarbons, such as cyclohexane, n-hexane, $C_8$-isoparaffins or technical-grade petroleum fractions, such as normal petroleum, ligroin, white spirit or solvent naphtha, having an aromatics content of up to 20% and a boiling point in the range from 50° to 200° C. can be used.

The nonionic surfactant having an HLB value of from 0.5 to 10, which should be at least partially soluble in the organic solvent, is normally a lipophilic sorbitan ester, such as, for example, sorbitan monolaurate, sorbitan monopalmitate or sorbitan monooleate. Also suitable are polyether esters, such as polyethylene glycol (200) monooleate, polyethylene glycol (200) monolaurate and polyethylene glycol (300) oleate.

It is advantageous to additionally use a predominantly water-soluble, nonionic dispersant having an HLB value of from 10.5 to 20. Examples of substances of this type include water-soluble polyethylene glycols having a molecular weight of from 200 to 20,000, in particular from 400 to 5,000, furthermore polyethylene glycol ethers made from an aliphatic monohydric alcohol having 6 to 20 carbon atoms and polyethylene glycol having 3 to 30, in particular 4 to 20, ethylene oxide units. Also suitable are commercially available $C_{12}$-fatty alcohol polyglycol ethers having 7 to 19 ethylene oxide units and an HLB value of from 13 to 18. Also suitable are polyoxyethylene sorbitan fatty acid esters, such as, for example, polyoxyethylene sorbitan monolaurate and polyoxyethylene sorbitan monooleate.

In a preferred embodiment, the dispersant mixture comprises from 50 to 90 per cent by weight of nonionic surfactants having an HLB value of from 4 to 10 and from 10 to 50 per cent by weight of nonionic surfactant having an HLB value of from 12 to 18.

The amount of dispersant mixture employed usually ranges from 1 to 10 per cent by weight, preferably from 2 to 5 per cent by weight, based on the weight of the olefinically unsaturated carboxylic acid. The olefinically unsaturated carboxylic acids have from 3 to 10 carbon atoms. Examples of these acids include acrylic acid, methacrylic acid, crotonic acid, tiglic acid and angelic acid. Preference is given to acrylic acid and methacrylic acid. The acids may be neutralized or partially neutralized using alkali metal or ammonium hydroxide solutions. Preference is given to sodium hydroxide solutions. The aqueous solutions of the unsaturated carboxylic acids usually have a solids content in the range from 20 to 45%. From 75 to 90 parts of unsaturated carboxylic acid are preferably employed.

Besides the unsaturated carboxylic acids, other olefinically unsaturated monomers, such as acrylamide, methacrylamide, the sodium salt of 2-acrylamido-2-methylpropanesulfonic acid, 2-methacryloylethanesulfonic acid, 2-hydroxymethylacrylate, 2-hydroxymethyl methacrylate, N,N-dimethylaminoethyl acrylate or methacrylate and the quaternary ammonium salts thereof in the form of their aqueous solutions can be used for the polymerization.

The aqueous solution which is added to polymerize the polysaccharide suspension may also contain fully or predominantly water-soluble crosslinking agents. Suitable compounds include vinyl compounds such as N,N-methylenebisacrylamide, 1,4-butanediol di(meth)acrylate, ethanediol di(meth)acrylate, diallyl maleate, glycidyl (meth)acrylate, allyl methacrylate, polyethylene glycol (450) dimethacrylate, and polyepoxides such as, for example, ethylene glycol diglycidyl ether, polyethylene glycol diglycidyl ether, glycerol triglycidyl ether and diglycerol tetraglycidyl ether.

Conventional polymerization initiators can be used for the graft polymerization. Examples of suitable initiators include ammonium peroxodisulfate, sodium peroxodisulfate and potassium peroxodisulfate, and corresponding peroxomonosulfates, dibenzoyl peroxide, dilauroyl peroxide, di-2-ethylhexyl peroxodicarbonate, dicyclohexyl peroxodicarbonate, tert.-butyl perpivalate, tert.-butyl perbenzoate, tert.-butyl permaleate, tert.-butyl hydroperoxide, di-tert.-butyl peroxide, hydrogen peroxide and redox catalysts. Suitable reducing components include ascorbic acid, sodium methylsulfinate, disodium sulfite and sodium hydrogen sulfite. Also suitable are azo initiators, such as azobisisobutyronitrile, 2,2-azobis(2-amidinopropane) dihydrochloride, 2,2'- azobis (4-cyanopentanecarboxylic acid) and 2-carbamoylazoisobutyronitrile.

The initiators in the solution of the unsaturated carboxylic acid can be added to the polysaccharide suspension. However, they can alternatively be added as a separate aqueous solution. It is also possible to introduce some of the initiator into the organic phase and to add the remainder to the reaction medium with the aqueous solution of the unsaturated carboxylic acid. From 0.03 to 0.5 part of initiator are preferably introduced into the organic phase and from 0.05 to 1.5 parts of initiator are preferably added in an aqueous solution. Potassium peroxodisulfate and ammonium peroxodisulfate are preferred.

The polysaccharide suspension and the aqueous solution may additionally contain conventional assistants and additives such as defoamers and complexing agents. Thus, for example, nitrilotriacetate, ethylenediaminetetraacetate or diethylenetriaminepentaacetate can be added to complex traces of iron.

The polymerization is preferably carried out at a temperature of from 50° to 75° C.

In the reverse-phase suspension polymerization, an aqueous polymer mixture is obtained which preferably has a solids content of from 30 to 50%, based on the sum of polymer and water.

When the polymerization is complete, some of the water is removed, preferably giving a residual water content of from 5 to 30%, based on the sum of polymer and water. The partial dewatering is generally carried out at from 50° to 100° C. by azeotropic distillation, possibly also under reduced pressure. Conventional dewatering equipment ca be used in which the organic phase is recycled.

After the partial dewatering, from 0.005 to 5 per cent by weight of crosslinking agent, based on the graft polymer, are preferably added. The content of crosslinking agent is preferably from 0.05 to 0.5 per cent by weight, and epoxides are preferred. Suitable compounds include, inter alia, polyglycidyl ethers, such as, for example, ethylene glycol diglycidyl ether, polyethylene glycol diglycidyl ether, glycerol triglycidyl ether and diglycerol tetraglycidyl ether. It is also possible to use polyaldehydes, such as glyoxal, or haloepoxy compounds, such as epichlorohydrin. These crosslinking agents are expediently added in aqueous or organic solution. The subsequent crosslinking is effected by heating to from 50° to 100° C., preferably to from 60° to 80° C. The crosslinking reaction is complete after from 0.5 to 4 hours.

After the crosslinking, the starch graft polymers are obtained in the form of pulverulent, porous particles with good flow properties which are composed of very finely divided primary particles. The particles can easily be separated from the continuous, organic phase, for example by filtration or centrifugation. They can subsequently be dried by conventional methods, for example under reduced pressure or using a fluidized bed, tumble or paddle drier, to give the pulverulent product. The filtrate can be reused in the next polymerization batch. The solvent and the water can also be separated from the polymer powder by distillation.

The polymerization gives a uniformly fine product having a narrow particle size distribution and high absorbency for water and body fluids.

For the purposes of this invention, finely divided products are those having particle sizes of less than 2 mm, with more than 85 per cent by weight of the products having particle sizes below 1,000 μm.

There is very little formation of large agglomerates and baked-on deposits.

Products are particularly suitable for incorporation into cellular, sorptive hygiene articles, such as disposable baby diapers, sanitary towels, cloths and patient undersheets. They can be used as desiccants, as swelling agents in sealants, as thickeners and as water-storage agents or humectants in agriculture.

Since the unsaturated monomers added are immediately polymerized, the evolution of heat during the polymerization can be readily monitored and controlled. In the case of continuous addition, heat is evolved continuously and can readily be dissipated. Temperature peaks do not occur.

The addition of the additional dispersant according to the invention spontaneously reduces the viscosity of the inverse suspension to the level at the beginning of the polymerization. Mixing is considerably improved, and baking together of the swollen polymer particles during the partial azeotropic removal of water is prevented.

The amphoteric ammonium compounds and quaternary imidazolinium salts employed in the invention are toxicologically acceptable. They are very compatible with the skin. They are raw materials for baby shampoos which do not irritate skin and eyes, and have a weak antibacterial action. For these reasons, they are particularly suitable for use in the preparation of swellable polymers for sorptive hygiene articles.

The process is generally carried out by dispersing the polysaccharide in the organic solvent in a stirred reactor and warming the dispersion to the desired polymerization temperature. An aqueous solution containing the unsaturated carboxylic acid and the polymerization initiator is subsequently metered in, whereupon polymerization with grafting takes place. After the polymerization, some of the water is removed by azeotropic distillation on a water separator. Post-crosslinking is subsequently carried out, and the polymer can be separated off as a finely divided product.

Having now generally described this invention, a further understanding can be obtained by reference to certain specific examples which are provided herein for purposes of illustration only and are not intended to be limiting unless otherwise specified.

EXAMPLES

Liquid retention capacity 70 ml of distilled water are added to 0.050 g of polymer or 70 ml of synthetic urine (mixture of 3,883 g of distilled water, 33.2 g of NaCl, 4.0 g of $MgSO_4.7H_2O$, 2.4 g of $CaCl_2$ and 77.6 g of urea) are added to 0.500 g of polymer in a 100 ml centrifuge tube, and the polymer is allowed to swell for one hour with gentle stirring. The gel phase is then separated from the sol phase by centrifugation for 0.5 hours at 4,500 rpm and weighed.

$$\text{Absorption capacity} = \frac{\text{Weight of gel} - \text{weight of sample}}{\text{Weight of sample}} \ (g/g)$$

Sorbency 0.050 g of polymer, when distilled water is used, or 0.100 g of polymer, when synthetic urine is used, is scattered on a glass frit (type G3, diameter 3 cm) which is connected to a liquid-filled burette and is levelled at the level of the glass frit. The amount of liquid absorbed is measured on the burette after 0.5 and 5 minutes.

$$\text{Sorbency} = \frac{\text{Amount of liquid absorbed}}{\text{Weight of sample}} \ (g/g)$$

The yields in g given in the Examples in all cases relate to products dried for 24 hours at 50° C. in a vacuum drying oven (15 mbar vacuum) to a residual moisture content of 7 per cent by weight. The viscosities given relate to 10% strength aqueous pastes at 20° C.

Comparative Example A

A suspension of
660 kg of cyclohexane
23 kg of a soluble starch having a viscosity number of 127 mPa s (AMISOL ®05515 from Cerestar, D-4150 Krefeld)
5.3 kg of sorbitan monolaurate
1.5 kg of polyethylene glycol having a molecular weight of 1,550 (POLYDIOL 1550 from Huls AG, D-4370 Marl)
23 g of ethylenediaminetetraacetate, dissolved in 1 liter of water, and
38 g of ammonium persulfate, dissolved in 1 liter of water,
is introduced into a 1200 l capacity stainless steel polymerization reactor equipped with a 2-arm Intermig stirrer, stirrer power recorder with a measurement range of from 0 to 10 kW, reflux condenser, water separator and feed lines. The contents of the reactor are heated to 68° C with stirring and flushed with nitrogen. A monomer solution obtained by neutralizing 95 kg of acrylic acid using 147 kg of 25% strength sodium hydroxide solution and adding 38 g of ethylene glycol diglycidyl ether, and, fed separately, an initiator solution of 152 g of ammonium persulfate in 4.5 l of water, are added over the course of one hour.

When all the monomer and initiator solutions have been added with constant stirring of the reaction mixture at 100 rpm, the mixture is stirred for an additional half an hour at 70° C. The stirrer power increases from 2 kW on commencement of addition of the monomer to 3.5 kw after the end of addition of the monomer. The reaction mixture has a creamy consistency and is not completely mixed. 95 kg of water ar then removed by azeotropic distillation at 600 mbar, the stirrer power consumption dropping to 2 kW (initial value). 76 g of ethylene glycol diglycidyl ether, dissolved in 1.7 l of water, are then added. The mixture is stirred for an additional 2 hours. The polymer is then filtered from the cyclohexane and dried at 60° C. in a paddle drier to a residual moisture content of less than 5%. 136 kg of predominantly finely divided starch graft polymer ar obtained.

Comparative Example B

The procedure is as in Comparative Example A, but a solution of 1 kg of sorbitan monolaurate in 2 kg of cyclohexane is added at a stirrer power consumption of 2.4 kW immediately after the monomer and initiator have been metered in. The stirrer power is not reduced and the mixing of the reactor contents is not improved.

EXAMPLE 1

The procedure is as described in Comparative Example A, but 3.5 l of a commercially available 30% strength aqueous solution of an N-alkylamidopropyl-betaine (SERVO-AMFOLYT JB 130, Servo, NL-7490 Delden) are added immediately after the monomer and initiator have been metered in. This additional dispersant causes a spontaneous drop in the stirrer power to 2 kW, which also remains at a constant low level during the azeotropic removal of water. Visual observation of the reactor contents shows a significant improvement in mixing.

EXAMPLE 2

| 450 | kg of cyclohexane, |
|---|---|
| 23 | kg of a native maize starch (type Cerestar GL 03402 from Cerestar, D-4150 Krefeld), |
| 1.5 | kg of sorbitan monolaurate (SPAN ® 20 from Atlas, Wilmington. Del., USA), |
| 1.0 | kg of polyethylene glycol having a molecular weight of 1,550, |
| 23 | g of ethylenediaminetetraacetate, dissolved in 1 liter of water, and |
| 38 | g of ammonium persulfate, dissolved in 1 liter of water, | are introduced into the polymerization reactor described in Comparative Example A. The reactor contents are heated to 70° C. with stirring and flushed with nitrogen. A monomer solution obtained by neutralizing 95 kg of acrylic acid using 147 kg of 25% strength sodium hydroxide solution and adding 62 g of ethylene glycol diglycidyl ether, and an initiator solution of 152 g of ammonium persulfate in 4.5 l of water are metered in over the course of one hour. After 75% of the solutions have been added, 1 liter of the additional dispersant used in Example 1 is added at a stirrer power consumption of 2 kW. The stirrer power does not increase any further during the further addition of monomer. The mixing remains unchanged at a good level. 95 kg of water are removed by azeotropic distillation at a reduced pressure of 600 mbar. The polymer is dried at 60° C. in a paddle drier to a residual moisture content of 5%. 136 kg of finely divided starch graft polymer with no coarse particles are obtained.

EXAMPLE 3

The procedure is similar to that of Example 1 with respect to the type and amount of the starting materials, but 3 l of a commercially available, 40% strength solution of coconut imidazoline (SERVO-AMFOLYT JA 140 from Servo) are added immediately after 100% of the monomer and activator have been metered in. The stirrer power drops spontaneously from 2.4 kW to 2 kW and does not change during the azeotropic removal of water. The visually observed mixing of the reactor contents is significantly improved.

EXAMPLE 4

The type and amounts of starting materials as in Example 1 are introduced into the polymerization reactor. The mixture is then heated to 70° C. with stirring and flushed with nitrogen. A monomer solution obtained by neutralizing 95 kg of acrylic acid using 147 kg of 25% strength sodium hydroxide solution and adding 30 g of pentaerythritol triacrylate, and an initiator solution of 80 g of potassium persulfate in 4.5 l of water are metered in over the course of one hour. The stirrer power increases from 2 to 2.4 kW during the addition of the monomer.

When addition of the monomer is complete, 3 1 of a slurry of 1. 2 kg of a 1-methyl-2-alkyl-3-alkylamidoethylimidazolinium salt (MARLOSOFT IQ 75 from Huls AG) prepared using $C_{16}$-$C_{18}$-tallow fatty acid, in 1.8 1 of cyclohexane is added. The stirrer power drops to 2 kW and does not change during the azeotropic removal of water. The reactor mixing is significantly improved. 95 kg of water are removed by distillation under a reduced pressure of 600 mbar. 70 g of ethylene glycol diglycidyl ether, dissolved in 1.7 1 of water, are then added. The mixture is stirred for a further 2 hours. The polymer is then filtered off from the cyclohexane and dried in a paddle drier. 135 kg of finely divided product containing no coarse or fine particles is obtained.

Table 1 below shows the particle size distributions and the water absorption values of the products.

TABLE 1

| | Screen analysis | | | Absorption capacity (g/g) | | Sorbency (g/g) | | | |
| | Coarse particles | Useful fraction | | | | Water after | | Synthetic urine after | |
| Ex. | >800 μm | 500–800 μm | 90–500 μm | Water | Synthetic urine | 0.5 min | 5 min | 0.5 min | 5 min |
| --- | --- | --- | --- | --- | --- | --- | --- | --- | --- |
| A | 13 | 31 | 56 | 280 | 34 | 66 | 120 | 14 | 20 |
| B | 7 | 54 | 39 | 250 | 33 | 30 | 104 | 9 | 18 |
| 1 | 2 | 12 | 86 | 290 | 35 | 90 | 140 | 17 | 23 |
| 2 | 0 | 19 | 81 | 210 | 31 | 116 | 190 | 20 | 25 |
| 3 | 2 | 33 | 65 | 350 | 40 | 32 | 90 | 10 | 18 |
| 4 | 0 | 61 | 39 | 320 | 38 | 54 | 122 | 12 | 19 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a process for the preparation of finely divided, porous and rapidly water-swellable polysaccharide graft polymers, comprising the steps of semicontinuous reverse-phase suspension polymerization, partial dewatering and crosslinking, the improvement being that during the suspension polymerization step, an aqueous solution containing from 60 to 95 parts of an olefinically unsaturated carboxylic acid which has been neutralized to the extent of from 50 to 100%, from 0 to 50 parts of at least one other olefinically unsaturated monomer, from 0 to 2 parts of crosslinking agent and from 0.005 to 5 parts of polymerization initiator, is added continuously at from 40° to 100° C. over the course of from 0.5 to 5 hours to a suspension of from 5 to 40 parts of polysaccharide and from 0 to 2 parts of polymerization initiator in a nonpolar organic solvent which contains 1 to 10% by weight, based on the total weight of said olefinically unsaturated carboxylic acid, of a dispersant mixture of (a) from 50 to 100% by weight of nonionic surfactant having a hydrophilic-lipophilic balance of 0.5 to 10, and (b) from 0 to 50% by weight of nonionic surfactant having a hydrophilic-lipophilic balance of from 10.5 to 20, and wherein, after from 75 to 100% of the aqueous monomer containing solution has been added, 0.2 to 4% by weight, based on the total weight of said olefinically unsaturated carboxylic acid, of an additional dispersant selected from the group consisting of an amphoteric ammonium compound containing an alkyl radical having 6 to 20 carbon atoms, a quaternary imidazolinium salt containing an alkyl radical having 6 to 20 carbon atoms, and mixtures thereof is added.

2. The process according to claim 1, wherein the amphoteric ammonium compound has structure I $$R-\overset{CH_3}{\underset{CH_3}{\overset{|}{\underset{|}{N^{\oplus}}}}}-CH_2-CH_2-COO^{\ominus} \quad (I)$$

or structure II $$R-\overset{CH_3}{\underset{CH_3}{\overset{|}{\underset{|}{N^{\oplus}}}}}-CH_2-CH_2-CH_2-SO_3^{\ominus} \quad (II)$$

where R is in each case an alkyl radical having 6 to 20 carbon atoms.

3. The process according to claim 1, wherein the quaternary imidazolinium salt has a betaine structure III (III)

where R is an alkyl radical having 6 to 20 carbon atoms.

4. The process according to claim 1, wherein quaternary imidazolinium salt has structure IV (IV)

in which R is alkyl having 6 to 20 carbon atoms.

5. The process according to claim 4, wherein the anion $X^{\ominus}$ is the methylsulfate anion.

6. The process according to claim 1, wherein from 0.4 to 2% of additional dispersant is added to the reaction medium.

7. The process according to claim 1, wherein the polysaccharide is a starch suspension.

8. The process according to claim 8, wherein from 10 to 25 parts of starch are suspended.

9. The process according to claim 1, wherein the polymerization is conducted at a temperature of 50° to 75° C.

10. The process according to claim 1, wherein the crosslinking is conducted by heating the polymerization product at 50°-100° C.

11. The process according to claim 1, wherein the polymerization medium is partially dewatered to a residual water content of 5 to 30%.

* * * * *